Patented June 10, 1952

2,599,573

UNITED STATES PATENT OFFICE 2,599,573

METHOD OF MAKING FLEXIBLE RESINOUS REPLICAS

Clare L. Milton, Jr., Roslyn Heights, N. Y., and Carl A. Nielson, Takoma Park, Md., assignors to the United States of America as represented by the Secretary of the Army No Drawing. Application April 7, 1949, Serial No. 86,107

5 Claims. (Cl. 18—47.5)

(Granted under the act of March 3, 1883, as amended April 30, 1928; 370 O. G. 757)

The invention described herein may be manufactured and used by or for the Government for governmental purposes, without payment to us of any royalty thereon.

The present invention relates to a process of making flexible replicas from resinous compositions that are adapted to deposit or to coagulate the resin under moderate temperature conditions, but which will have prolonged storage life without appreciable deterioration, and which are suitable for a number of industrial applications. Thus, for example, replicas of complicated objects such as human hands, are required at one stage of several processes for constructing molds in which to make realistic coverings for artificial hands. It is very useful in such applications to make such replicas in impressions of a model hand taken in calcium alginate composition containing about 65 per cent to 85 per cent water and, furthermore, made at atmospheric pressure.

Other objects and advantages of the invention will become apparent as the description proceeds, and the features of novelty will be pointed out in particularity in the appended claims.

The compositions used in the present invention employ as major resins any one of several commercial vinyl chloride polymers or copolymers, the vinyl chloride content of which is between 93 per cent and 99 per cent and the particle size of which is less than ten microns and dispersions of which in plasticizers do not contain appreciable weight fractions of particles less than 120 millimicrons in diameter. There is preferred, in accordance with this invention, resin dispersions of which do not contain any large amount of material under 100 millimicrons and the vinyl chloride content of which is less than 98 per cent, the former to prevent premature gelation, the latter to facilitate gelation below 100° C. Although gels have been prepared with resins of lower vinyl chloride content, their storage lives appear to be inadequate, in some cases a matter of only a few hours.

The resinous compositions used in this invention employ as plasticizers materials selected from one or more of the following groups:

1. Dialkyl esters of phthalic anhydride, the sum of whose paraffinic carbon atoms lies between eight and fourteen, and in addition di-2-ethylhexyl phthalate.

2. The dialkyl pimelates, adipates, pelargonates, and sebacates, the total number of the carbon atoms of which totals between fourteen and twenty.

3. Tri-alkyl aconitates, tricarballylates, and acetyl citrates, containing not more than twenty-three carbon atoms nor less than eighteen.

4. Phosphates, chosen from the group tributyl, trihexyl, tricresyl, or tricresyl-aryl phosphates containing between fifteen and eighteen carbon atoms, examples of which are dicresyl-monobutyl phosphate and monocresyl-dibutyl phosphate.

The stated content of between fifteen and eighteen carbon atoms as applied to the phosphates of group 4 above applies to mixed cresyl-aryl triesters of phosphoric acid, such as, for example, dicresylmonobutyl phosphate and monocresyl-dibutyl phosphate. While the members of any of the indicated groups 1 through 4 may be employed as "normal" (i. e. nonpolymerizing) plasticizers for the vinyl chloride polymer, the members containing less than seventeen carbon atoms should not be used except in admixture with those of other groups, as otherwise satisfactory storage life is not maintained.

The following illustrative examples indicate suitable compositions for carrying out the present invention, the amounts in each example being parts by weight:

Example I

| | |
|---|---|
| Vinylite VYNU-1 | 50 |
| Acetyl tributyl citrate | 18 |
| Dihexyl phthalate | 30 |
| Polyethyl methacrylate | 2 |

Example II

| | |
|---|---|
| Geon 100×74 | 50 |
| Tributyl phosphate | 24 |
| Dibutyl sebacate | 24 |
| Vinylite VYDR | 2 |

In the foregoing examples "Vinylite VYNU" and "Vinylite VYDR" are vinyl chloride-vinyl acetate copolymer resins manufactured by the Carbide and Carbon Chemical Co., New York, N. Y., while "Geon 100×74" is a vinyl chloride resin produced by the B. F. Goodrich Chemical Co., Cleveland, Ohio.

Either of these compositions will gel in from one to two minutes at 85° C. and after being maintained at this temperature for two hours, is sufficiently tough and strong to be handled without special care. Either composition is well suited for making flexible replicas by being gelled in alginate impressions.

In carrying out the present invention, an object which is intended to be duplicated is invested in a suitable material, such as a liquid gelable alginate, which is allowed to gel about the object. The object or model then is removed from the investment, without distortion of the impression, thereby leaving a negative of the model in the investment material which accurately reproduces all of the surface details of the model. The gelation of the alginate investment material may be expedited by gentle heat.

The impression is heated, preferably in a bath of hot water, to not over 85° C., and preferably only to 65° C. The heated impression is removed from the water bath, drained and into it is poured a resinous dispersion of the above-indicated compositions, or as further illustrated by Example III, the amounts being parts by weight:

Example III

| | |
|---|---|
| Paste grade polyvinyl chloride-vinylacetate copolymer | 100 |
| Dibutyl phthalate | 25 |
| Tricresyl phosphate | 25 |
| Polyethyl methacrylate | 4 |

The chosen resinous dispersion, which is not too viscous to flow readily, is poured into the heated impression and the latter is rotated so that the dispersion is spread over the entire surface of the impression. The dispersion upon coming into contact with the hot walls of the impression gels, forming a relatively thin skin of a flexible plastic material. This plastic skin is a very accurate reproduction of the original model from which the impression was made, the resulting flexible skin being a positive of the impression.

It is found in practice that it is essential to employ in addition to the above-described vinyl chloride polymer, a second polymerized resin which is soluble in the plasticizer used, and which is present in the resinous composition in solution in the plasticizer, and which is compatible with the vinyl chloride polymer being employed. In the absence of such second resin, the flexible positive reproduction which has been obtained as described above would possess insufficient mechanical strength to permit handling. The special compositions herein disclosed are required to yield a product of useful strength at a temperature substantially below 100° C. While it is recognized that many compounds are known which actually do gel below 100° C., either they have insufficient stability on storage, or they do not possess sufficient mechanical strength, or, in some cases, their viscosity or other properties makes them unsuitable for the duplication of very fine detail by the process disclosed. The use of the alginate impression material is of highly practical importance, because other gelable impression compounds such as those based on agar or those compositions containing plaster of Paris cannot be used in practice because they become fluid again on heating, as in the case of agar, or are not sufficiently flexible and elastic in the case of the latter, while the alginate employed in accordance with this invention (although because of its high water content the impression preferably should not be taken above 85° C., or even still more preferably not above 65° C., because of danger of distortion of the impressed fine, detailed surface lines, or mechanical failure of the impression) can be heated safely at least to the said temperature; and it is found in practice that only through the combination of the use of the alginate and the above-described low-temperature-gelable, flexible compositions can a flexible, hollow replica of an object of complicated shape, such as a human hand, be produced which will have sufficient strength and dimensional accuracy.

In connection with the compositions of the above examples, it is to be pointed out that the polyethyl methacrylate of Examples I and III and the Vinylite VYDR of Example II must be dissolved in the plasticizer with heating and stirring, for example, by stirring for about thirty minutes at 120° C. to 140° C., and the resulting solution is cooled before being mixed with the vinyl chloride polymer. The vinyl chloride polymer is merely stirred in, if the polymer is substantially as described with respect to particle size, and if the particles exist either at that particle size, that is below ten microns, or if the agglomerates are sufficiently loose so that the polymer disperses to that particle size without grinding. However, if the particular grade of vinyl chloride polymer being employed happens to be too viscous to produce a composition that can be poured, some degree of grinding, such as is done in a three-roll paint mill or a pebble mill, would be necessary to produce a liquid composition of sufficiently low viscosity to be poured. The compositions of the present invention are found to have a gelation time of from one to five minutes at 85° C., and not objectionably longer at 65° C.

In operating with the foregoing compositions it is noted in practice that gelation is rapid at 85° C., usually occurring in about one minute after the film actually comes to temperature. However, the strength of the deposit continues to increase for some time at this temperature and it is desirable that the deposit be maintained at this temperature for a minimum of fifteen minutes and preferably from thirty to sixty minutes.

From the foregoing illustrative compositions, it will be apparent that there are employed as dissolved resins only those which are compatible with the only ingredients of the plasticized vinyl chloride when the latter is completely fused. There are included in the composition, as indicated above, the polymeric alkyl acrylates and methacrylates and their copolymers with polyvinyl acetate. There may be included also polymers of vinyl chloride and its copolymers with vinyl acetate or alkyl acrylates, methacrylates, fumarates, and maleates, and the chlorinated derivatives of the same. However, the composition is limited to resins having average molecular weights of over 40,000. There are thus excluded such resins as polystyrene, which is not truly compatible with the present compositions.

Stabilizers, pigments, and fillers may be incorporated in the flexible model composition used in the present invention. Preferably, not more than 40 per cent by weight of filler is employed, since quantities in excess of this result in the production of weak, "cheesy" stocks.

The compositions used in the present invention are found in practice to have satisfactory storage life, the resins which preferably are employed not gelling on storage within two months either in compositions which are employed or in similar compositions without dissolved polymer. Somewhat shorter storage life is obtained in certain of the fastest gelling formulae such as those plasticized by tributyl phosphate or acetyl tributyl citrate, but adequate storage life is present even with these compositions.

The present invention employs compositions which produce high fidelity reproduction of surface characteristics of any given model form. While it is of particular significance, as in the production of high fidelity positives of a model natural hand in the making of cosmetic gloves duplicating the natural hand in appearance and texture, the invention is not limited to such application, but is of general application where it is desired to duplicate the surface characteristics of any object with high fidelity. Accordingly, it will be understood that it is intended and desired to embrace within the scope of this invention such modification and changes as may be necessary to adapt it to varying conditions and uses as defined by the appended claims.

It will be understood that the term "non-polymerizable plasticizer of the type described" as used in the appended claims refers to the plasticizer compositions defined in the above-referred-to Groups 1 through 4.

This application is a continuation-in-part of our copending application Serial No. 5,715, filed February 2, 1948, now abandoned, entitled "Resinous Composition and Process of Molding Articles Therefrom."

Having thus described our invention, what we claim as new and wish to secure by Letters Patent is:

1. The process of making flexible, resinous replicas of a model object, which comprises producing a hollow negative of the object by introducing the object into a fluid gellable alginate investment material which on gelling produces calcium alginate, heating the investment material with the object therein until the said material gels around the object, and withdrawing the object from the gelled alginate investment to leave an impression of the object therein as a hollow duplicating negative of the object, introducing into the said negative a resinous composition composed of a resinous dispersion of a vinyl chloride polymer in a non-polymerizing plasticizer for the vinyl chloride polymer, and a polymerized resin that is soluble in the said plasticizer compatible with the vinyl chloride polymer, and having a molecular weight of not less than 40,000, the said vinyl chloride polymer containing between 93 per cent and 99 per cent of vinyl chloride, the resinous composition having a gelation temperature of from approximately 65° C. to approximately 85° C., and heating the resinous composition in the said negative impression to gelation temperature until the said composition is gelled on the surfaces of the impression, and removing the resulting gelled positive replica of the object from the negative impression.

2. The process of making flexible, resinous replicas of a model object, which comprises introducing a model object, the surfaces of which are to be duplicated in resin, into a fluid gellable alginate investment material which on gelling produces calcium alginate, heating the investment material with the object therein until the said material gels around the object and withdrawing the object from the gelled alginate investment while avoiding damage to the details of the resulting negative impression, introducing into the said impression a resinous composition composed of a resinous dispersion of a vinyl chloride polymer in a non-polymerizing plasticizer therefor and a second polymerized resin dissolved in the said plasticizer, the second resin being soluble in the plasticizer, compatible with the vinyl chloride polymer, and having a molecular weight of over 40,000, the vinyl chloride polymer containing between 93 per cent and 99 per cent of vinyl chloride, the said resinous composition having an elevated gelation temperature but not above 85° C., agitating the resinous composition in the impression until all surfaces of the impression are covered with a coating of the resinous composition while heating the impression and composition therein to gelation temperature of the composition, thereby gelling the resin coating on the surface of the impression, thereby forming a flexible positive replica of the model object.

3. The process of making flexible, resinous replicas of a model object, which comprises introducing a model object, the surfaces of which are to be duplicated in resin, into a fluid gellable alginate investment material which on gelling produces calcium alginate, heating the investment material with the object therein until the said material gels around the object and then withdrawing the object from the gelled alginate investment while avoiding damage to the surface details of the resulting negative impression, preparing a resinous composition composed of a dispersion of a vinyl chloride polymer in a non-polymerizable plasticizer therefor and a second polymerized resin dissolved in the said plasticizer, the said second resin being soluble in the plasticizer and compatible with the vinyl chloride polymer, and having a molecular weight of over 40,000, the said resinous composition having a gelation temperature of approximately 85° C., heating the alginate impression to 85° C., introducing the resinous composition into the heated impression, contacting the resinous composition will all heated surfaces of the impression thereby effecting gelation of the resin on the heated surfaces of the impression and producing a resinous positive of the impression accurately reproducing the surface details of the negative impression and removing the resulting resinous positive from the impression.

4. The process of making flexible, resinous replicas of a model object which comprises introducing a model object the surfaces of which are to be duplicated in resin into a fluid gelable alginate composition which on gelling produces calcium alginate, allowing the composition to gel around the object, thereby producing a hollow negative impression of the object in the alginate gel, in which impression all surface details of the model object are reproduced in high fidelity detail, removing the object from the alginate impression while avoiding damage to the details thereof, preparing a dispersion of a vinyl chloride polymer in a non-polymerizable plasticizer therefor, the vinyl chloride polymer containing from approximately 93 per cent to approximately 98 per cent of vinyl chloride and having a particle size of less than ten microns, dissolving in the plasticizer a second polymerized resin, the second resin being soluble in the plasticizer and compatible with the vinyl chloride polymer, and having a molecular weight of over 40,000, and proportioning the vinyl chloride polymer, the dissolved resin and the plasticizer to produce a resinous composition having a gelation temperature of from substantially 65° C. to substantially 85° C., introducing the resinous composition into the alginate impression, heating the impression to gelation temperature of the said resinous composition, contacting the resinous composition with all heated surfaces of the impression, thereby effecting gelation of the resinous composition on the surfaces of the impression, the impression being heated to a temperature of 85° C., whereby forming a flexible resinous positive of the model object, and recovering the resulting flexible positive from the impression.

5. The process of making flexible resinous replicas of a model object, which comprises producing a hollow, seamless negative of the object by introducing the object into a fluid gelable alginate investment material which on gelling produces calcium alginate, gently warming the investment material with the object therein until the said material gels around the object, and withdrawing the object from the resulting gelled alginate investment to leave an impression of the object therein as a hollow, seamless duplicating negative of the object, cooling the negative, introducing into the said cooled negative a resinous composition composed of a resinous dispersion of a vinyl chloride polymer in a non-polymerizing plasticizer for the vinyl chloride polymer, and a second polymerized resin that is soluble in the plasticizer and compatible with the vinyl chloride polymer, and having a molecular weight of over 40,000, the said vinyl chloride polymer containing between 93 per cent and 99 per cent of vinyl chloride, and contacting the second resin with the plasticizer until dissolved therein, the resulting resinous composition having a gelation temperature of from approximately 65° C. to approximately 85° C., heating the resinous dispersion in the said negative impression to gelation temperature until the composition is gelled on the surfaces of the impression, continuing the heating for a controlled time and temperature to control the thickness of the resulting gelled film, cooling the impression and dispersion therein to stop the gelation of the dispersion, pouring out remaining ungelled dispersion from the impression, thereby leaving the gelled portion of the gelled dispersion as a seamless, flexible, duplicating positive of the model object lining the said impression, and removing the said positive from the impression.

CLARE L. MILTON, JR.
CARL A. NIELSON.

REFERENCES CITED

The following references are of record in the file of this patent:

UNITED STATES PATENTS

| Number | Name | Date |
|---|---|---|
| 2,327,128 | Renfrew et al. | Aug. 17, 1943 |
| 2,345,255 | Gross | Mar. 28, 1944 |
| 2,359,512 | Dickson et al. | Oct. 3, 1944 |
| 2,385,920 | Jenkins | Oct. 2, 1945 |
| 2,473,723 | Nelson | June 21, 1949 |